2,973,271

PROCESS FOR IRRADIATING FROZEN COCONUT MEAT

Robert R. Baldwin, Chatham, and William J. Ohan, Jr., New Providence, N.J., assignors to General Foods Corporation, White Plains, N.Y., a corporation of Delaware No Drawing. Filed Jan. 14, 1957, Ser. No. 633,815

3 Claims. (Cl. 99—125)

This invention relates to a method of reducing microbiological deterioration in coconut. More specifically it relates to a process employing ionizing penetrating radiation whereby coconut may be rendered free of microbiological spoilage.

Coconut meat, especially when exposed to air or other sources of contamination, is very susceptible to microbiological spoilage and decay. This is evidenced by discoloration which is readily apparent. Typical of the reactions which may occur in coconut are reactions of the Maillard type wherein condensation products of amino acids and sugars are formed. A high rate of deterioration is particularly observed in fresh coconut meat which is characterized by a high level of moisture, a high level of potential free sugar, and ample amino acids which contribute an ideal environment for these undesirable changes.

In order to minimize the deterioration or spoilage of coconut, it has been the practice to desiccate coconut meat shortly after picking. The desiccated or dried meat may be readily handled for reasonable periods of time without undergoing undesirable changes. Subsequent use of the material usually requires rehydration. Rehydrated coconut products are also susceptible to many of the same types of microbiological contamination and/or discoloration to which the fresh coconut is subject. It has become customary therefore to employ chemical agents and/or various pasteurization procedures to minimize spoilage, discoloration, or any undesirable microbiological changes.

The various techniques which have been employed heretofore to this end have been deficient in that they are either expensive, require substantial times for their operation, requires substantial outlay for equipment, or that they introduce undesirable off colors or off flavors to the coconut, the latter two factors being particularly present when chemical agents have been employed.

It is an object of this invention to provide a process for producing coconut in a form which is substantially free of microbiological contaminations. Another object of this invention is to produce a product coconut which is characterized by extended storeability, freedom from spoilage, and freedom from discoloration.

According to certain aspects of this invention, coconut meat may be irradiated with ionizing penetrating irradiation to produce a product characterized by reduced spoilage, substantial absence of off colors and off flavors, and by extended shelf life.

Although the results of the present invention may be obtained by irradiating fresh coconut meat, they may also be obtained by irradiating coconut which has been desiccated and which may have been rehydrated. It is convenient to irradiate fresh or rehydrated desiccated coconut meat when packaged, but the advantages of this invention can also be obtained by the irradiation of coconut meat immediately after picking and shelling.

The ionizing penetrating radiation which can be employed to give the desired coconut product of this invention includes beta and gamma rays. Beta rays include cathode rays, the former term being the common designation when the rays originate from a naturally or artificially radioactive source, while the latter designation is commonly employed to indicate rays produced in an electrical apparatus e.g. of the vacuum tube type.

The term gamma rays as used herein, is intended to include therewithin X-rays. The term "gamma" is commonly employed when the rays originate from a naturally or artificially radioactive source, while the term "X-rays" is commonly used when the rays are continuously produced by electron bombardment of suitable targets in an appropriate apparatus.

The ionizing penetrating radiation which can be used in the process of this invention is that having an energy falling within the range of $10^{-3}$ mev. up to about 15 mev.; when the preferred type of radiation, i.e. gamma radiation including X-radiation, is employed, the energy thereof will typically fall in the range of $10^{-3}$ mev. up to about 2.5 mev. Typically the wave length of the preferred gamma radiations will be within the range of 0.01 up to about 14 Angstrom units.

It has been found that gamma rays emitted by radioactive atoms, particularly atoms which have been artificially rendered radioactive by bombardment thereof with e.g. neutrons are particularly suitable for use in connection with this invention. When gamma radiation from such a source is used, the preferred energy ranges are those falling within the range of $8.8 \times 10^{-3}$ mev. up to 2.5 mev. stated above.

Cobalt-60 is prepared e.g. by irradiating normal cobalt of atomic weight 59 in a uranium pile wherein neutrons are present. As a neutron strikes an atom of cobalt-59, it forms the artificially radioactive cobalt-60 which emits gamma radiation having an energy of 1.1 and 1.3 mev. The half-life of cobalt-60 is 5.3 years.

Although the particular details of treatment of the coconut by radiation will vary depending upon the condition of the coconut and the type of radiation used, it is found that satisfactory results can be obtained by operating at atmospheric pressure and at a coconut temperature ranging from −78° C. up to 30° C. The distance between the radiation source and the coconut being irradiated may vary, but typically it will be of the order of from 1 inch up to about 18 inches. Under these conditions irradiation may occur for a period ranging from about 5 seconds up to as long as 8 hours. In the case of beta radiation, the time may be as little as 5 seconds and the preferred maximum will not be above 15 minutes. In the case of gamma radiation the preferred range is 15 minutes to 3 hours, with best results being obtained after about 3 hours.

Although no particular treatment or pretreatment of the coconut before irradiation is required, it has been found that highly satisfactory results may be obtained when a coconut being irradiated is enclosed within containers e.g. cans. It will be apparent to those skilled in the art that when the coconut is contained within cans, the metal of the cans must be such that when subjected to any one of the radiations noted, it will not produce any undesirable side effects. Although the coconut meat may be irradiated in air, it has been found that particularly desirable results are obtained when the meat is contained within an inert gaseous atmosphere. Carbon dioxide is the preferred inert gaseous atmosphere, but nitrogen is suitable. It has also been found that coconut which has been frozen prior to irradiation is particularly characterized by a very low microbiological activity and by substantial freedom from off colors and off flavors even after extended periods of storage. When freezing of coconut is effected prior to irradiation, the preferred temperature to which the coconut is frozen is −78° C. (sublimation point of solid carbon dioxide). Practice of the present invention may be more fully understood by reference to the following detailed description of experiments indicating how the desirable results may be obtained. In these experiments, the radiation employed is measured in terms of the rep. (i.e. Roentgen equivalent physical). A rep. is a measure of the amount of radiation falling on a particular material, and is measured by determining the effect upon a standard such as the commonly used methylene blue indicator, located immediately adjacent to the sample being irradiated. At the conclusion of the radiation experiment, the number of rep.'s supplied to the coconut can be determined by comparing the irradiated methylene blue with a standard non-irradiated methylene blue sample.

Fresh coconut meat was shredded into 1/16" shreds immediately after having been dehusked and drained free of coconut milk. The shreds were packaged in pressure-tight cylindrical tin-plated steel cans. During such packaging the cans were sealed under normal atmospheric temperatures and pressures in atmospheres of either carbon dioxide, nitrogen or air. The canned coconut shreds were then frozen by being subjected to solid carbon dioxide at temperatures in the order of $-78°$ C. The cans were then introduced to cobalt-60, a primary gamma radiation source, and different dosages ranging upwards to 4 million rep. (Roentgen equivalent physical) were administered. Thereafter, the cans were removed and tested for microbiological population, flavor, and color.

Without radiation under a given set of conditions, canned, fresh, shredded coconut packaged in a $CO_2$ atmosphere had a standard plate count in excess of 13,000 per gram whereas, when irradiated with 0.5 to 4.0 million rep. a similar sample of canned coconut had a plate count measured after irradiation of less than 500 per gram. Below 0.5 million rep. the percent survival of bacteria measured by specific plate count increased, and at 50,000 rep. the percent survival was close to 100%.

In the case of canned fresh shredded coconut packaged and irradiated under similar conditions in a nitrogen atmosphere or in an atmosphere of air, the precent survival of bacteria, yeasts and molds, at doses between 50,000 and 0.5 million rep. was substantially the same as in the case of coconut packaged and irradiated in a $CO_2$ atmosphere. At doses above 0.5 million rep, the plate count measured after irradiation was acceptably low. Fresh shredded coconut which was vacuum packed, i.e. had air purged therefrom, and irradiated, required a higher dose of cobalt-60 radiation before the specific plate count survival percentage was reduced to a negligible level. On the other hand, in all cases at doses above 2.0 million rep. there was a noticeable off-flavor and off-odor which can best be described as resembling oxidative rancidity.

Accordingly, gamma radiation at a dose exceeding 50,000 rep. is specified as the minimum dose at which the improvements of the present invention are substantially obtained; but since gamma radiation at doses above 2.0 million rep. causes an undesirable off-flavor and odor where the benefits of microbiological deactivation may not be practically utilized, a dose of 2.0 million rep. is the preferred maximum dose.

In order to ascertain the effect of gamma radiation on the aforesaid samples, the cans of coconut were stored under conditions duplicating 18 months of household refrigerator storage after which, and during which, the cans were opened and samples were tasted. Fresh coconut meat irradiated by cobalt-60 had an acceptable coconut flavor and white color at a dose sufficient to lower the standard plate count to a negligible amount. Despite the fact that the cans of coconut were stored under only mild refrigeration there was no can swelling when the coconut was irradiated with cobalt-60 at a level in excess of 0.5 million rep. indicating little or no microbiological activity. At lower levels of dose in the order of less than 0.5 million rep., the cans of coconut swelled due to the pressure developed by the aforesaid microbiological activity such that they had to be disposed of. It is noteworthy that when coconut is packaged under similar conditions without such irradiation, a pasteurization and/or the separate addition of mold inhibitors are required to prevent can swelling.

This application is a continuation-in-part of application Serial No. 547,320, filed November 16, 1955, by Robert R. Baldwin and William J. Ohan, Jr., entitled "Coconut."

It will be understood that while the invention has been described in part by means of specific examples reference should be had to the appended claims for a definition of the scope of the invention.

What is claimed is:

1. A process for preserving fresh coconut meat against deterioration in flavor, color and odor caused by microbiological contamination while preserving substantially unchanged its natural high moisture and oil contents which comprises comminuting the fresh meat, packing the comminuted fresh meat in a container to protect it against subsequent contamination from external sources, freezing the fresh meat, and then irradiating the frozen meat in the container with gamma radiation at a dose exceeding 0.05 million rep. but not greater than about 2.0 million rep.

2. A process as defined in claim 1 including the step of substantially replacing the air in the container with a gas selected from the group consisting of carbon dioxide and nitrogen.

3. A process as defined in claim 1 including the step of evacuating said container.

References Cited in the file of this patent

FOREIGN PATENTS 745,962    Great Britain _____ Mar. 7, 1956

OTHER REFERENCES

Official Gazette, vol. 657, No. 5, Apr. 29, 1952, abstracts of application No. 552,558 to Lyle B. Borst, pub. Apr. 29, 1952.

Refrigerating Engineer, January 1953, pp. 55, 56, 57, article by L. E. Brownell et al.

Food Manufacture, June 1955, pp. 233 to 236, article by Eng. Res. Inst. of Univ. of Mich.

Reprint from Agricultural and Food Chemistry, vol. 3, No. 11, page 958, of November 1955.

Refrigerating Engineering, June 1956, pp. 39 to 49 and 98.

Food Manufacture, Apr. 1957, pp. 169, 170, 171, 172.